US008954427B2

(12) United States Patent
Silber et al.

(10) Patent No.: US 8,954,427 B2
(45) Date of Patent: Feb. 10, 2015

(54) SEARCH RESULT PREVIEWS

(75) Inventors: Jeremy Silber, New York, NY (US); Doantam Phan, Milpitas, CA (US); Christopher H. Rohrs, New York, NY (US); Xiaofeng Mi, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 13/118,970

(22) Filed: May 31, 2011

(65) Prior Publication Data

US 2013/0275422 A1 Oct. 17, 2013

Related U.S. Application Data

(60) Provisional application No. 61/380,613, filed on Sep. 7, 2010.

(51) Int. Cl.
*G06F 7/00* (2006.01)
(52) U.S. Cl.
USPC .......................................................... 707/728
(58) Field of Classification Search
USPC .......................................................... 707/728
See application file for complete search history.

(56) References Cited

U.S. PATENT DOCUMENTS

| 7,020,338 | B1 * | 3/2006 | Cumbee ..................... 382/230 |
| 8,370,342 | B1 * | 2/2013 | Li et al. ..................... 707/728 |
| 2005/0149576 | A1 | 7/2005 | Marmaros et al. |
| 2006/0069670 | A1 | 3/2006 | Khaliq et al. |
| 2006/0288124 | A1 * | 12/2006 | Kraft et al. ..................... 709/246 |
| 2008/0022229 | A1 | 1/2008 | Bhumkar et al. |
| 2009/0217168 | A1 * | 8/2009 | Dexter et al. ................. 715/731 |
| 2009/0313100 | A1 | 12/2009 | Ingleshwar |

FOREIGN PATENT DOCUMENTS

| WO | WO2006001920 A1 | 1/2006 |
| WO | WO2007115079 A3 | 11/2007 |
| WO | WO2010081255 A1 | 7/2010 |

OTHER PUBLICATIONS

Jones et al, "Interactive document summarisation using automatically extracted keyphrases," Proceedings of the 35th Annual Hawaii International Conference on System Sciences, Jan. 7-10, 2001 pp. 1287-1296, XP010587397.
PCT Notification of Transmittal of the International Search Report and the Written Opinion of the International Searching Authority, or the Declaration. International Application No. PCT/US2011/050627. European Patent Office. Feb. 2, 2012. 19 pages.

(Continued)

*Primary Examiner* — Rehana Perveen
*Assistant Examiner* — Hung Havan
(74) *Attorney, Agent, or Firm* — Fish & Richardson P.C.

(57) ABSTRACT

Methods, systems, and apparatus, including computer programs encoded on a computer storage medium, for providing search result page previews. In one aspect, a method includes receiving data that specify a set of search results responsive to a search query. Query-relevant content is selected to be included in a page preview for at least one of the search results. In turn, data that cause presentation of the page preview are provided. The data provided can cause presentation of the query-relevant content at an initial zoom level and at a higher zoom level, where the initial zoom level is a zoom level at which both the query-relevant content and other content from the resource are presented. The page preview can include a page tear that defines multiple portions of the page preview for a resource.

25 Claims, 7 Drawing Sheets

(56) References Cited

OTHER PUBLICATIONS

PCT Invitation to Pay Additional Fees and, Where Applicable, Protest Fee. Annex to Form PCT/ISA/206 Communication Relating to the Results of the Partial International Search. International Application No. PCT/US2011/050627. European Patent Office. Dec. 8, 2011. 14 pages.

Notification Concerning Transmittal of International Preliminary Report on Patentability for PCT/US2011/050627 dated Mar. 21, 2013, 10 pages.

Teevan et al., "Visual Snippets: Summarizing Web Pages for Search and Revisitation" CHI 2009, Apr. 4-9, 2009 (online) (Retrieved on Sep. 9, 2013). Retrieved from the internet: http://research.microsoft.com/pubs/79632/chi09-snippet.pdf, 11 pages.

Woodruff et al., "Using Thumbnails to Search the Web" SIGCHI '01, Mar. 31-Apr. 4, 2001, (online) (Retrieved on Sep. 18, 2013). Retrieved from the internet: http://citeseerx.ist.psu.edu/viewdoc/download?doi=10.1.1.28.3774&rep=rep1&type=pdf, 8 pages.

\* cited by examiner

SEARCH RESULT PREVIEWS

CROSS-REFERENCE TO RELATED APPLICATIONS

This application claims the benefit under 35 U.S.C. §119(e) of U.S. Patent Application No. 61/380,613, entitled "SEARCH RESULT PREVIEWS," filed Sep. 7, 2010, which is incorporated herein by reference in its entirety.

BACKGROUND

This specification relates to digital information retrieval and presentation.

The Internet provides access to a wide variety of resources such as video or audio files, web pages for particular subjects, book articles, or news articles. A search system can identify resources in response to a text search query that includes one or more search phrases (i.e., one or more words). The search system ranks the resources based on measures of relevance of the resources to the search query and on measures of quality of the resources. In turn, the search system selects a quantity of the ranked resources and provides search results that link to the selected resources. The search results are typically ordered for viewing according to the rank of the resource to which the search result links, and provided in a search results page.

The search results page displays a list of search results, and each search result includes several lines of text (a "snippet") that are intended to show how the resource to which the search result links is relevant to the query. However, this snippet of text may not provide the user with enough information for the user to determine whether the resource referenced by the search result provides data that the user prefers. Thus, the user may need to click on multiple search results and scroll through or search the web pages (or other resources) that are linked to by the search results in order to find data that is formatted in the manner that the user prefers.

SUMMARY

In general, one innovative aspect of the subject matter described in this specification can be embodied in methods that include the actions of receiving data that specify a set of search results responsive to a search query, the search query including one or more query terms; selecting, for at least one search result in the set of search results, a set of query-relevant content to be included in a page preview for the search result, the page preview being a visual representation of a resource that is referenced by the search result; inserting a page tear into the page preview, the page tear defining a first portion and a second portion of the page preview, the first portion being different from the second portion; inserting first query-relevant content from the resource into the first portion of the page preview; inserting second query-relevant content form the resource into the second portion of the page preview, the second query-relevant content being content selected from a portion of the resource that is not presented in the first portion of the page preview; and providing data that cause presentation of the page preview. Other embodiments of this aspect include corresponding systems, apparatus, and computer programs, configured to perform the actions of the methods, encoded on computer storage devices.

These and other embodiments can each optionally include one or more of the following features. Methods can further include the actions of identifying, as query-relevant content, text in the resource that matches at least one query term of the search query; and analyzing a context of the query-relevant content, the context including a location of the query-relevant content and other content that appears within a threshold distance from the query-relevant content. Selecting a set of query-relevant content can include selecting, based on the context, the query-relevant content that satisfies a minimum relevance threshold.

Analyzing the context can include determining a quantity of query terms that are within a threshold number of pixels of the query-relevant content; determining a total quantity of query terms that are included in the resource; computing a first score for the query-relevant content based on the quantity of query terms and the total quantity of query terms; determining a content category for the query-relevant content; and adjusting the first score based on the content category for the query-relevant content.

Adjusting the first score can include reducing the first score in response to determining that the content category is one of a footnote or anchor text that links to another resource. Providing data that cause presentation of the page preview can include providing data that cause presentation of the first portion of the page preview and the second portion of the page preview at presentation positions that represent relative locations of the first query-relevant content and the second query-relevant content in the resource.

Providing data that cause presentation of the page preview can include providing data that causes presentation of the page preview at a page preview slot that is adjacent to the search query. Providing data that cause presentation of the page preview can include providing data that cause presentation of the page preview in response to user selection of a page preview user interface element that is presented with the search results.

Providing data that cause presentation of the page preview can include providing data that includes a link to the resource referenced by the search result. Providing data that includes a link to the resource can include providing data that includes a first link to a location of the resource at which the first query-relevant content is located and further includes a second link to a location of the resource at which the second query-relevant content is located. The first link can be associated with the first portion of the page preview and the second link is associated with the second portion of the page preview.

Providing data that cause presentation of the page preview can include providing data that cause presentation of the page preview in response to user selection of any portion of the search result other than a link to the resource referenced by the search result. Providing data that cause presentation of the page preview further can include providing data that cause the search result to be highlighted in response to receiving data indicating that a pointing device indicator is located over the search result. Providing data that cause presentation of the page preview can include providing data that cause the first query-relevant content to be presented with a larger font than at least a portion of other content included in the first portion of the page preview.

Another innovative aspect of the subject matter described in this specification can be embodied in methods that include the actions of receiving data that specify a set of search results responsive to a search query, the search query including one or more query terms; selecting, for at least one search result in the set of search results, a set of query-relevant content to be included in a page preview for the search result, the page preview being a visual representation of a resource that is referenced by the search result; and providing data that cause presentation of the page preview, the data comprising data that cause presentation of the query-relevant content at an initial zoom level and at a higher zoom level, the initial zoom level being a zoom level at which both the query-relevant content and other content from the resource are presented in the page preview, the higher zoom level being a zoom level that is higher than the initial zoom level. Other embodiments of this aspect include corresponding systems, apparatus, and computer programs, configured to perform the actions of the methods, encoded on computer storage devices.

These and other embodiments can each optionally include one or more of the following features. Selecting a set of query-relevant content can include selecting query-relevant text that matches the search query. Providing data that cause presentation of the page preview can include providing data that cause presentation of an instance of the query-relevant text at the initial zoom level; and providing data that cause presentation of another instance of the query-relevant text at the higher zoom level. The query-relevant text can be presented at the higher zoom level and visibly emphasized relative to other content presented in the page preview.

Selecting a set of query-relevant content can include selecting at least one query-relevant image. Providing data that cause presentation of the page preview can include providing data that cause presentation of an instance of the query-relevant image at the initial zoom level; and providing data that cause presentation of another instance of the query-relevant image at the higher zoom level. Providing data that cause presentation of the page preview can further include providing data that cause a portion of the page preview that is presented at both the initial zoom level and the higher zoom level to be visibly emphasized at the initial zoom level.

Methods can further include the actions of determining that the resource includes additional query-relevant content that is not presented in the page preview; and providing data that cause presentation of the additional query-relevant content with the page preview, the presentation of the additional query-relevant content including a user interface element indicating that the additional query-relevant content is located at a portion of the resource that is not presented in the initial page preview.

Particular embodiments of the subject matter described in this specification can be implemented so as to realize one or more of the following advantages. Page preview snippets reduce the quantity of pages that users visit prior to obtaining information for which the users are searching, thereby reducing the time required for the users to find information that satisfies their informational needs, and creating a more streamlined user search experience. Users are able to determine which resources provide data in preferred formats and/or contexts using page previews that are presented with search results.

Page tears enable content from different portions of a resource to be presented in a single page preview slot that is adjacent to search results, showing more relevant page sections than could fit in a contiguous page preview. Accordingly, the users need not navigate from the search results pages to the resources to determine which resources satisfy their informational needs and which do not.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
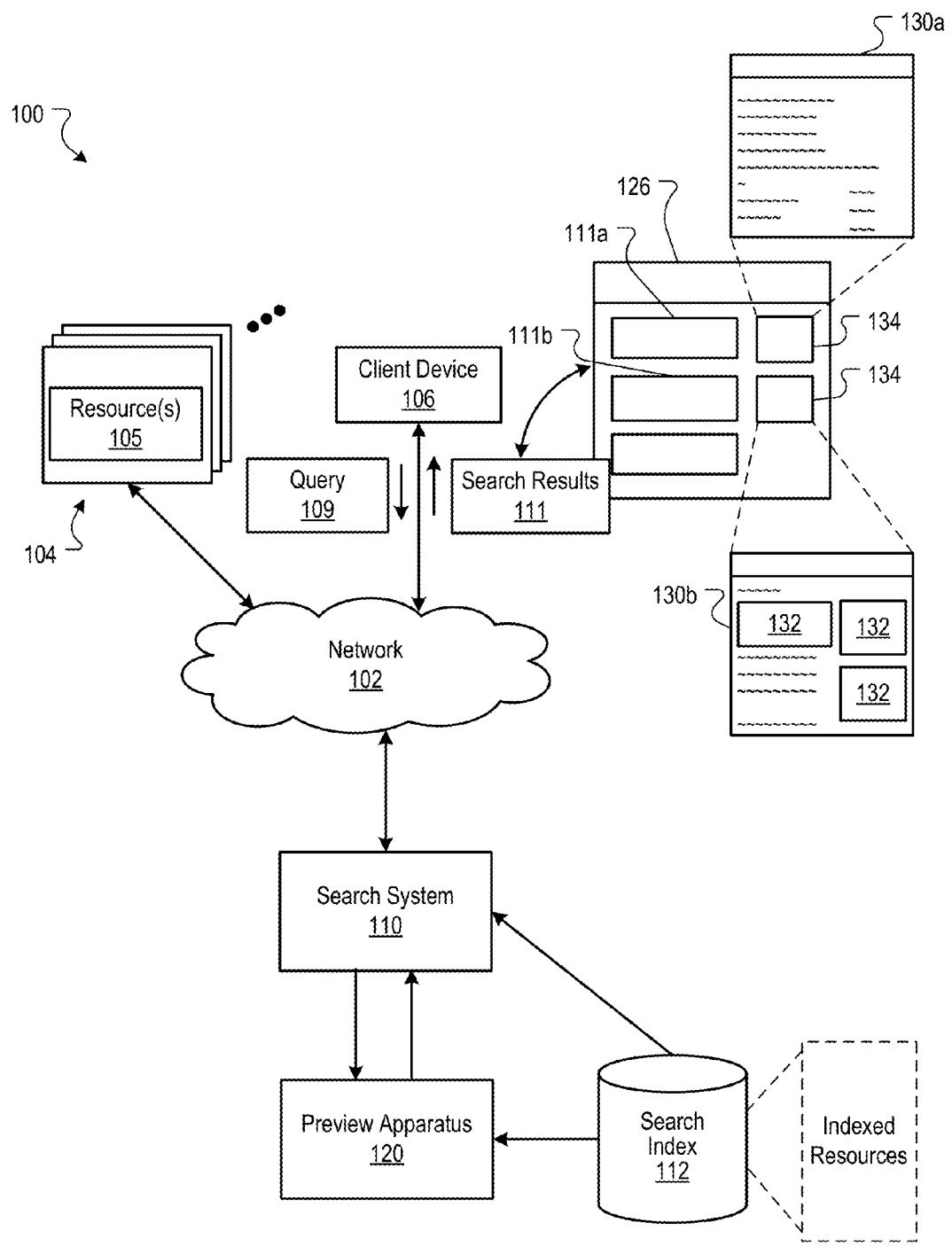
FIG. 1 is a block diagram of an example environment in which a search system provides search services.

FIG. 1 is a block diagram of a search environment 100 that facilitates resource search operations on a client device. The example environment 100 includes a network 102, e.g., a local area network (LAN), wide area network (WAN), the Internet, or a combination of them. The network 102 connects Websites 104, client devices 106, and the search system 110. The environment 100 may include many thousands of publishers 104 and client devices 106.

A Website 104 is one or more resources 105 associated with a domain name and hosted by one or more servers. An example Website is a collection of Web pages formatted in hypertext markup language (HTML) that can contain text, images, multimedia content, and programming elements, e.g., scripts. Each Website 104 is maintained by a publisher, e.g., an entity that manages and/or owns the Website.

A resource 105 is any data that can be provided by a Website 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

A client device 106 is an electronic device that is under control of a user and is capable of requesting and receiving resources 105 over the network 102. Example client devices 106 include personal computers, mobile communication devices, and other devices that can send and receive data over the network 102. A client device 106 typically includes a user application, e.g., a web browser, to facilitate the sending and receiving of data over the network 102.

To facilitate searching of resources 105, the search system 110 identifies the resources 105 by crawling and indexing the resources 105 provided on Websites 104. Data about the resources 105 can be indexed based on the resource to which the data corresponds. The indexed and, optionally, cached copies of the resources 105 are stored in search index 112.

The client devices 106 submit search queries 109 to the search system 110. For instance, any particular search query 109 can include one or more terms consisting of words, numbers or other characters. As an example, the search query 109 entered by the user can be "puzzle cube" to search online for information regarding geometric cube puzzles. In response to receipt of the search query 109, the search system 110 accesses (e.g., using a search engine) the search index 112 to identify resources 105 that are relevant to the search query 109. The search system 110 identifies the resources 105, generates search results 111 that identify the resources 105, and returns the search results 111 to the client devices 106.

For example, the search results 111 can include resources 105 that have been identified as having at least a threshold relevance score for the search query "puzzle cube." A search result 111 is data generated by the search system 110 that identifies a resource 105 that is responsive to a particular search query, and includes a link to the resource 105. An example search result 111 can include a Web page title, a snippet of text or a portion of an image extracted from the Web page, and the URL of the Web page.

For a search of textual content, the search results are ranked based on relevance scores of the resources 105 identified by the search results 111. The relevance scores can be computed, for example, based on information retrieval ("IR") scores, and optionally a quality score of each resource relative to other resources. In some implementations, the IR scores are computed from dot products of feature vectors corresponding to a search query 109 and a resource 105. Quality scores can be computed, for example, based on visual characteristics of the page, such as page layout, font sizes, and a quantity of images presented on the page. The quality scores can also be computed based on user feedback regarding page quality and/or a determination of whether the page includes, or links to a page that includes, malware (e.g., computer viruses). The search results 111 are ordered according to these relevance scores and provided to the client device 106 for presentation according to the order.

The client devices 106 receive the search results 111, e.g., in the form of one or more search result pages 126, and render the search results 111 for presentation to users. The search results 111 include data specifying a set of resources 105 that have been identified as relevant to the search query submitted by the client device 106 (e.g., based on relevance scores). As noted above, the search results 111 can also include a "snippet" from the resource 105 that has been identified as relevant to the search query 109. For example, a snippet can be two lines of text that represent the contents of the resource 105 that is linked to by the search result 111.

A snippet generally includes one or more "tidbits" that have been identified in the textual content of the resource 105 that is linked to by the search result 111. As used herein, a "tidbit" is text that can be included in a snippet. In some implementations, a tidbit is a portion of contiguous text in the resource, such as a group of adjacent words in the search result 111 displayed on the user's client device 106. Each search result 111 can include one or more snippets, where each snippet includes one or more tidbits. Tidbits can be identified, for example, by the search system 110 and/or a preview apparatus 120 (described below).

A search result 111 that includes a snippet provides a user with data that enables the user to determine whether to request presentation of the resource 105 that is linked to by the search result 111. For example, using data provided by the snippet, the user can determine whether a web page includes content for which the user is searching. However, a snippet may not provide the user with data specifying the context (e.g., content location, and/or nearby content) in which content relevant to their search query is presented, the format of the presentation, or data specifying web page display characteristics (i.e., page length, images that are included in the page, page formatting information) for the web page, or, if the snippet does provide some indication of the context or format, it may not provide enough information for the user to determine whether the resource would satisfy the user's informational needs. Therefore, the user may be required to visit the web page in order to make the determination.

Some users that are searching for data begin their search with an initial preference of the format ("format preference") in which they would like to receive the content for which they are searching. For example, a particular user that is searching for "puzzle cube" may prefer to view pages that provide text instructions (e.g., in a numbered or bulleted list) to solve a particular puzzle cubes, while another user that submits that same search query may want to receive a series of photos that illustrate how to solve the particular puzzle cube. In another example a user that enters the search query "sports scores" may want sports scores provided in a table format (e.g., box scores), while another user may be interested in receiving sports scores within articles that recap the sporting event. Since different users may have different preferences of how they want information presented, and because these preferences may change from one search to another, it can be difficult to determine which display characteristics each users prefers for each search query.

In some implementations, the search system 110 provides users with data about the format in which data is presented by a web page. A client device 106, using data provided by the search system 110, displays characteristics of the web page to provide "page previews" with the search results. Page previews are visual representations (e.g., images) of a web page to which a search result links. In some implementations, images of web pages are stored in a data store that is accessible by the search system 110. The images that are stored can represent a threshold number of page pixels (e.g., 10,000 pixels) for each page. The resolution of the image can be reduced by a reduction factor (e.g., ⅓) to reduce the amount of data stored for each web page. When a page preview is selected to be presented to a user, a portion of the page preview (e.g., ⅓ of the reduced resolution representation) can be selected to be presented to the user, as described below.

FIG. 1 includes two example page previews 130a and 130b, each of which is rendered in page preview slots 134. Page preview 130a presents a portion of web page 131a to which search result 111a links, while page preview 130b presents a portion of web page 131b to which search result 111b links. The portion of the web page presented in the page preview 130a only includes text, while the portion of web page that is presented in the page preview 130b includes text and images 132. Using the page previews 130a and 130b, a user can obtain information about the formatting of the web pages to determine which of the web pages is formatted in a manner that the user prefers for this particular search. However, content not included in the page previews 130a, 130b may provide additional information about the formatting of the web page, as described in more detail with reference to FIG. 2.

Portions of a search result page in which page previews are presented are referred to as page preview slots 134. The size of a page preview slot may be fixed or decided according to the available whitespace, or may be proportional to a size of the search result 111 with which the page preview is associated (i.e., the search result that links to the page represented by the page preview). For example, a page preview slot for a particular search result can be required to occupy a same quantity (or fewer) vertical pixels as the particular search result. Additionally, the quantity of horizontal pixels occupied by the page preview slot can be limited based on the white space that exists between the particular search result and a visible edge of the page that is presented by the client device 106. In some implementations, the size of each page preview slot is selected to be proportional to an aspect ratio of a web page for which a page preview is being generated, or even proportional to the size of the resource the preview represents.

Figure 2:
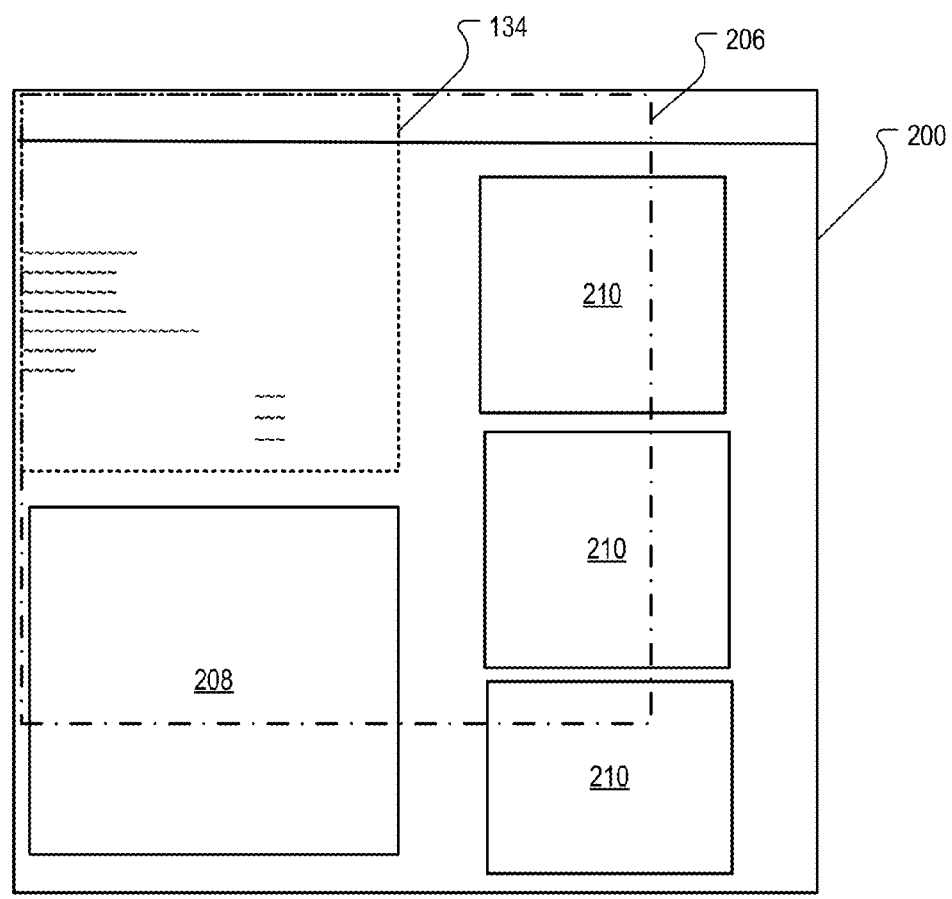
FIG. 2 is a block diagram of a web page that is being represented in a page preview slot.

Size limitations for page previews 130 may prevent the user from being able to determine whether the formatting of the web page represented by the page preview 130 satisfies the user's format preference, or whether the content of the web page represented by the page preview 130 is relevant to the user's search query. This is described with reference to FIG. 2, which is a block diagram of a web page 200 that is being represented in a page preview slot 134. As illustrated by FIG. 2, the size of the page preview slot 134 is smaller than the size of the web page 200. When the size of the page preview slot 134 is smaller than and/or has a different aspect ratio than the web page 200 that is being represented in the page preview slot 134, portions of the web page 200 will not be presented in the page preview slot 202.

If the portions of the web page 200 that are not presented in the page preview slot 134 are relevant to the user's search query and/or provide additional information about the content, context, and/or format of the web page 200, the user is unable to use this additional information to determine whether to request presentation of the web page 200. For example, if the portion of the web page 200 that is outlined by the page preview slot 134 is the only portion of the web page 200 that is presented to the user in the page preview slot, the user may be unaware that the web page 200 includes a table 208 and images 210. Thus, based on the portion of the web page 200 that is presented in the page preview slot 134, the user may not click the search result that links to the web page 200 if the user is looking for web pages that include images relevant to the user's search query. Additionally, the user is also unable to determine the length of the web page based on the page preview.

In some implementations, the size of the web page 204 can be reduced so that a larger portion of the web page 200 can be presented in the page preview slot 202. For example, if the resolution of the representation of the web page 200 (e.g., an image of the web page) is reduced (i.e., relative to an initial resolution), the portion of the web page 200 that is outlined by the box 206 may be able to be presented in the page preview slot 134. However, reducing the resolution of the web page representation that is presented in the page preview slot 134 will reduce the user's ability to use the page preview to determine the content of the web page. For example, the user may be able to determine where text and/or images are presented on a web page by viewing a web page representation that has reduced resolution (relative to a full scale representation), but the user may not be able to read text that is presented in the page preview, or to view image details due to the lowered resolution.

Referring again to FIG. 1, the search system 110 is in data communication with a preview apparatus 120 that generates page previews that include page preview snippets. Page preview snippets are snippets that are presented in a page preview and include query-relevant information (e.g., query-relevant text or images). In some implementations, query-relevant text in the page preview snippets can be highlighted or otherwise emphasized (e.g., bolded, italicized, or presented in a different font color) relative to non-snippet text. The page preview snippets and/or query-relevant text can also be enlarged, as described in more detail with reference to FIG. 5.

Page preview snippets can be used to provide additional details about the web page to the user. For example, in response to the search query "Belgian Waffles," the search system 110 may determine that an online encyclopedia article about Belgian waffles is relevant to the search query, and generate a search result that links to the article. The preview apparatus 120 generates and/or provide a page preview for the search result that references the article. For example, the page preview that is generated for the Belgian waffle encyclopedia may include an image of a Belgian waffle and a snippet that includes the text "Belgian waffles are prepared with a yeast leavened batter."

In some implementations, the search system 110 inserts both the search result and the page preview into the search results page that is being provided to the client device 106 in response to the search query. In these implementations, the search result and the page preview are both presented when the search results page is rendered. In other implementations, the search system 110 inserts a link (or another reference) to the page preview into the search result, such that the page preview is presented in response to a request to view the page preview (e.g., a user click of a page preview icon or hypertext link, or a mouse over), as described in more detail below.

Figure 3:
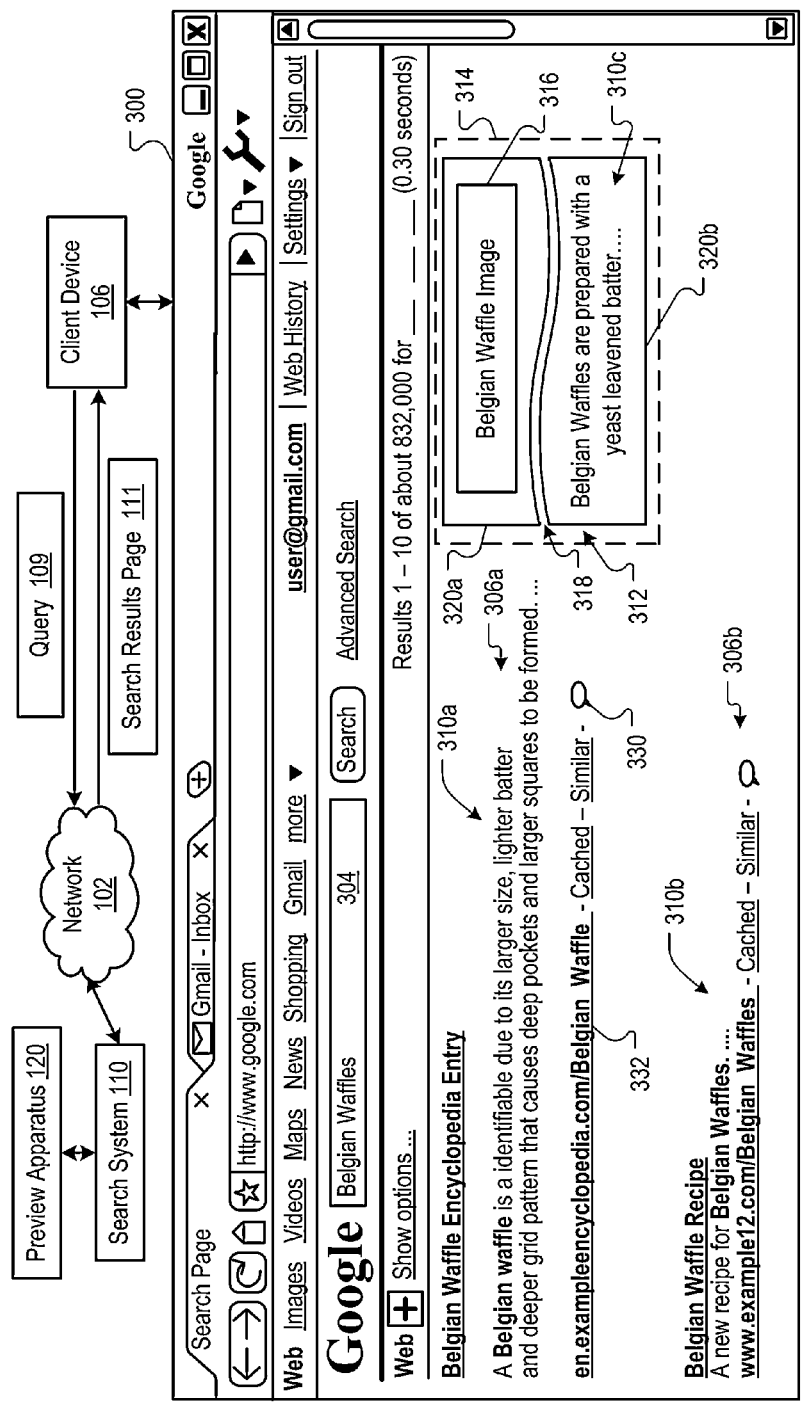
FIG. 3 is a screen shot of an example search results page in which a page preview is presented.

FIG. 3 is a screen shot of an example search results page 300 in which a page preview 312 is presented. The search results page 300 presents search results 306a and 306b that were identified as responsive to the search query "Belgian Waffles," that was submitted using a search text box 304. Each of the search results 306a, 306b includes a snippet 310a, 310b. The search result 306a also includes a page preview 312 that is presented in page preview slot 314. The page preview 312 includes a snippet 310c that the search system 110 identified as relevant to the search query "Belgian Waffles," as well as an image 316 that the search system 110 identified as relevant to the search query (e.g., based on a caption for the image, a filename of the image, or text within a specified number of pixels of the image).

In some implementations, the snippet 310c (and each other snippet presented in a page preview) can be a different snippet than the snippet 310a that was selected for inclusion in the search result 306a. For example, the page preview slot 314 may provide more space in which snippets and/or other content can be presented. Therefore, the snippet 310c selected by the preview apparatus 120 can be a snippet that was not eligible to be included in the search result snippet 310a based on snippet size restrictions associated with the search result 306a.

Additionally, the preview apparatus 120 can filter snippets that have been included in the search result 306a may from a set of snippets that are available for inclusion in the page preview 312. Alternatively, in some implementations, a threshold quantity of snippets that have not been included in the search result 306a may be selected by the preview apparatus 120 for inclusion in the page preview 312 before snippets that are included in the search result 306a are selected. Preferring (e.g., though filtering and/or order of selection) snippets that have not been included in the search result 306a increases the variety of snippets that are presented to the user. For some search results, the threshold quantity of snippets may be greater than a quantity of snippets that have not been included in the search results 306a. Therefore, the preview apparatus 120 can also select snippets that have been included in the search results 306a. For example, if the threshold quantity of snippets is equal to or greater than a total quantity of available snippets for a search result, then the preview apparatus can select all of the available snippets for inclusion in the page preview 312.

Multiple snippets 310 and/or images 316 can be available for inclusion in a page preview 312. However, one or more of these snippets 310 and/or images 316 may appear at portions of a web page that would not typically be included in a page preview 312, as described above with reference to FIG. 2. For example, the snippets 310 and/or images 316 may appear outside of a contiguous area of the web page (or a reduced resolution version of the web page) that is able to be presented in the page preview slot 314. Thus, in some implementations, the preview apparatus 120 of FIG. 1 generates a "page tear" in a page preview to indicate that the page preview is presenting a non-contiguous representation of the web page. A page tear is a graphical user interface element that provides an indication that a portion of a web page is not presented by a page preview. For example, the page tear 318 is a graphical separation (i.e., defined by two curves) that is presented between the portion 320a of the page preview 312 in which the image 316 is presented and the portion 320b in which the snippet 310c is presented. A page tear is not required to be defined by multiple curves or lines. For example, a single line or curve could be used to represent a page tear.

Page tears can be used to present snippets 310 and/or images 316 that are identified as relevant to a search query irrespective of the location of the snippets 310 and/or images on the web page. For example, assume that the image of the Belgian waffle 316 appears at the top of the encyclopedia article, while the snippet "Belgian Waffles are prepared with a yeast leavened batter" 310c appears at the bottom of the encyclopedia article. Further assume that the length of the encyclopedia article prevents the entire encyclopedia article from being presented in a contiguous page preview (i.e., a page preview that does not include a page tear), while maintaining the legibility of the snippet 310c. For example, the preview apparatus 120 can determine the number of search results to be shown to determine the size of the page preview area. Using this size, the preview apparatus determines the approximate font size (or reduction percentage) that would result in showing a contiguous page preview; if the font size (or reduction percentage) are below a threshold value, then a page tear is generated. In this example, a portion of the web page that includes the image of the Belgian waffle 316 can be presented in the portion 320a of the page preview 312, while the snippet 310c can be presented in the portion 320b that is separated from the portion 320a by the page tear 318.

The preview apparatus 120 of FIG. 1 can include multiple page tears in a single page view. For example, when query-relevant content (i.e., text and/or images) has been identified in several different portions of a web page, the preview apparatus 120 can create three or more portions 320 in which the query-relevant content can be presented. Each different portion of the web page that has been identified can be presented in a different portion 320 of the page preview 312, and each of the different portions can be separated from the other portions 320 by a page tear 318.

In some implementations, the portion of the web page that is rendered in each portion 320 of the page preview can be a disjoint portion of the web page relative to the other portions of the web page that are presented in each of the other portions 320 of the page preview. For example, each of the portions 320a, 320b of the page preview 312 can only include content that is not included in the other portion 320b, 320a of the page preview 312. Rendering disjoint portions of the web page in the portions 320 of the page preview 312 facilitates presentation of a page preview that is representative of a larger portion of the web page than the portion of the web page that might be represented by a page preview 312 in which content presented in the portions 320 overlaps. In some implementations, content of a web page (e.g., snippets and/or images) can be presented in a portion of a page preview that represents the relative positioning of the web page content, as described in more detail with reference to FIG. 4.

In some implementations, the search system 110 includes page preview element 330 with the search result 306a. The page preview element 330 is a user interface element (e.g., an icon) indicating that a page preview is available for the search result. For example, the search results page 302 can be initially presented without displaying the page preview 312. In this, example, the page preview 312 can be presented in response to receiving data indicating that the user selected the page preview element 330.

Presentation of the page preview 312 can also be caused in response to receiving data indicating that the user interacted with a portion of a search result, for example clicking a designated icon or link, or any portion of the search result 306a other than the link 332 to the resource referenced by the search results. Additionally, the page preview can be presented in response to determining that a pointer indicator (e.g., a mouse pointer) has been located over the search result for at least a minimum specified time, or that a pointer or finger completed a specific gesture.

Figure 4:
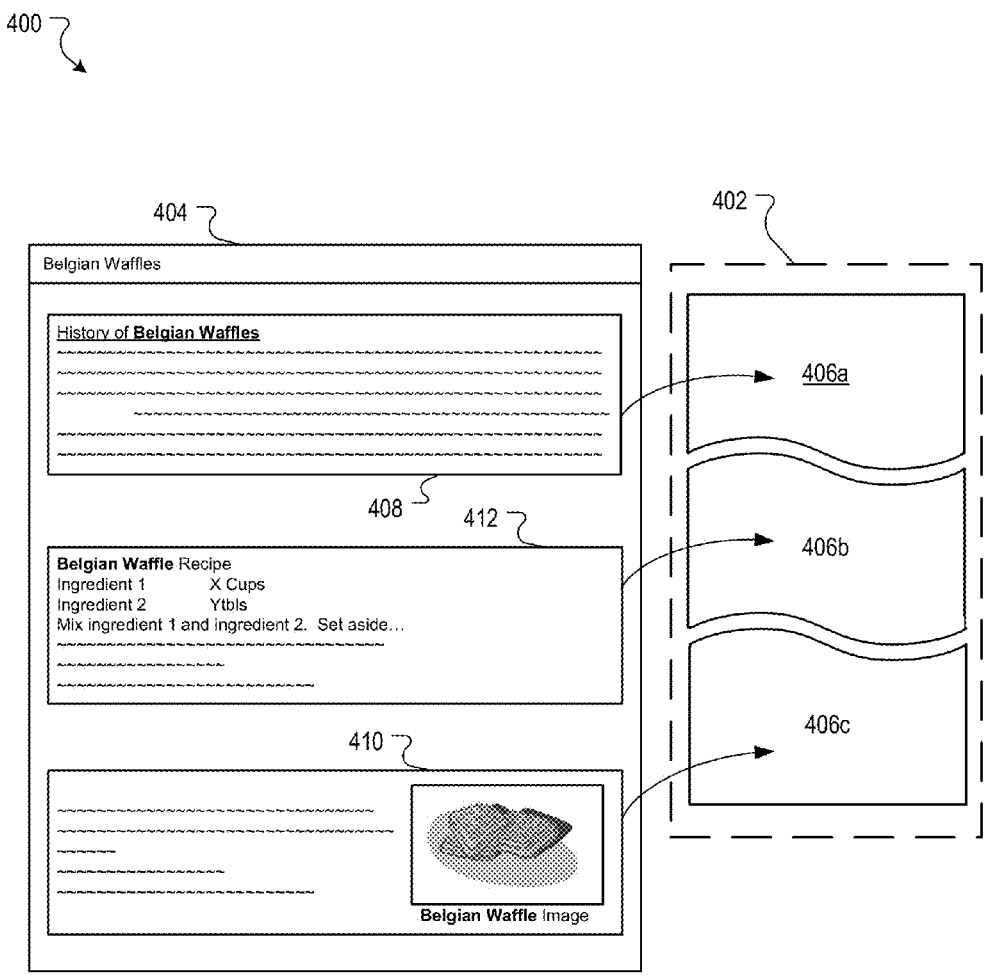
FIG. 4 is a block diagram of a page preview generated using content from a web page.

FIG. 4 is a block diagram 400 of a page preview 402 generated by the preview apparatus 120 using content from a web page 404 and snippet and tidbit locations provided by the search engine 110. The content 408, 410, and 412 from the web 404 are inserted into page preview portions 406a-406c that respectively represent the relative locations of the content in the web page 404. For example, web page portion 408 appears at the top of the web page 404, and therefore is inserted at a top page preview portion 406a. Similarly, web page portion 410 appears at the bottom of the web page 404, and therefore is inserted at a bottom portion 406c of the page preview 402. The web page portion 412 is located between the web page portion 408 and the web page portion 410. Therefore, the web page portion 412 is inserted into the page preview 402 at portion 406b, which is between portions 406a and 406c. Thus, each portion of the web page 404 is presented at a portion of the page preview 402 that represents the relative position of the content in the web page 404.

In some implementations, the size of the page preview, and the size of each page tear can be selected to have a same aspect ratio as the web page (or the portion of the web page represented). Thus, the portion of the content that is displayed in each portion of a page preview can be determined based on the aspect ratio of the web page and the size of the page preview in which the content will be presented. Additionally, the portion of content displayed in each portion of a page preview can be selected based on a pre-specified amount of text (e.g., two sentences) to be included in each portion of the page preview, or based on a pre-specified number of pixels of the web page to be included in each portion of the page preview.

Figure 5:
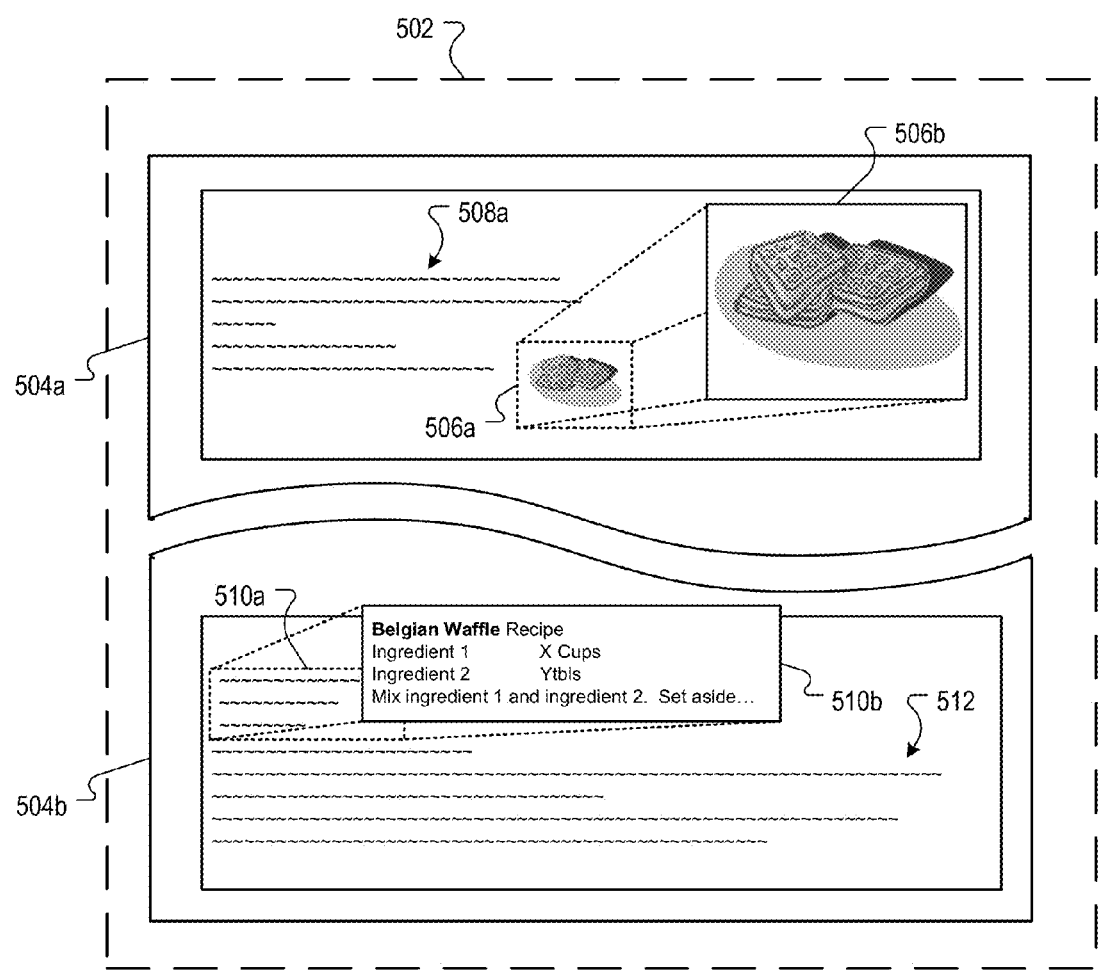
FIG. 5 is a block diagram of an example page preview to which a zoom feature is applied.

FIG. 5 is a block diagram of an example page preview 502 to which a zoom feature is applied. A zoom feature can be applied a page preview to enlarge a portion of the web page content that is presented in the page preview. The page preview 502 includes two page preview portions 504a, 504b in which two portions of a web page are presented. The portion 504a is presented at with an initial zoom level, while an image 506a is presented at a higher level of zoom (i.e., made larger) relative to the initial zoom level. The initial zoom level can be a zoom level at which web page formatting, context, and content types are visually discernable, while text may or may not be legible. The higher level of zoom can increase the size of text and images relative to the initial zoom level so that zoomed text is legible and/or details of images are more easily viewed.

For example, the image 506a is an image of a Belgian Waffle presented at an initial zoom level and the image 506b is the image of the Belgian Waffle presented at a higher level of zoom. Presentation of the image 506a in the page preview portion 504a provides a representation of the portion of the web page in which the image 506a is presented so that a user can visually examine web page formatting (or content context) and determine what type of content is presented on the web page near the image 506a. For example, visual analysis of the portion 504a allows a user to determine that the image 506a is the only image presented in the portion of the web page represented in the portion 504a, and that text 508a is presented adjacent to the image 506a.

The image 506b provides a zoomed-in view (i.e., a larger representation) of the image 506a. The zoomed-in view presents a larger version of the image 506a so that visual details of the image are more easily perceived. Thus, a user can more readily determine whether the image 506b provides a level of visual detail that is preferred by the user.

The portion 504b includes text (e.g., a snippet) that is presented in a same portion of a web page as query-relevant text 510a. The query-relevant text 510a is presented in the portion 504b at an initial zoom level so that a user can visually examine web page formatting, content context, and content types presented on the web page near the query-relevant text 510a, as described above. The text box 510b provides a zoomed-in view of the query-relevant text 510a. In some implementations, the zoomed-in view presents the query-relevant text 510a with at least a minimum specified font size. For example, the text box 510b may present the query-relevant text at 12 point font so that the query-relevant text is legible. Presenting zoomed-in text in the text box 510b enables a user to analyze the content of the web page without being required to navigate to the web page. The zoomed-in text may also be reformatted for consistency or legibility or to highlight sections relevant to the user query, and may be edited for brevity.

In some implementations, zoomed-in views of images and/or query-relevant text can be presented at locations that prevent occlusion (either partial or total) of the images and/or query-relevant text that is presented at the initial zoom level. For example, the image 506b is presented at a location of the page preview 504a that does not occlude any of the text 508a or the image 506a. However, the text box 510b is positioned so that the query-relevant text 510a is only partially occluded by the text box 510b.

In some implementations, the zoom feature can be implemented by a client side script or instructions that the preview apparatus 120 provides with the preview data. The zoomed-in views can be presented in pop-up widows, or can alternatively be rendered within the search results page using dynamic formatting processes (e.g., manipulation of document object model (DOM) elements).

Figure 6:
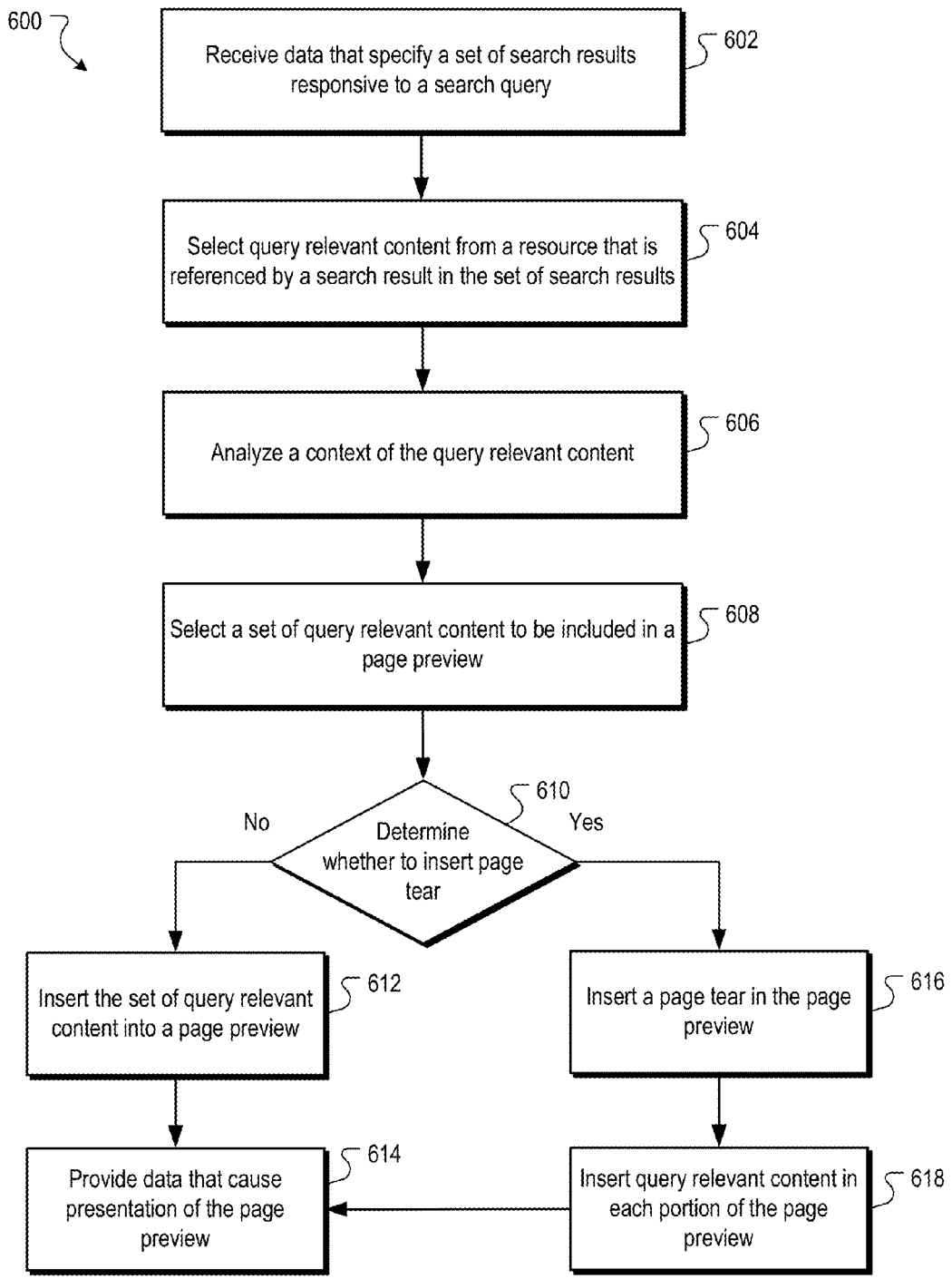
FIG. 6 is an example process for generating page previews.

FIG. 6 is an example process 600 for generating page previews. The process 600 is a process by which search result data (i.e., data that specify a set of search results responsive to a search query) are received. Query-relevant content is selected from a resource that is referenced by a search result in the set of search results. A context of the query-relevant content is analyzed and a set of query-relevant content is selected for inclusion in a page preview for the search result. Using the set of query-relevant content, a determination is made whether the page preview should include a page tear. If the page preview should not include a page tear, the page preview is generated using the set of query-relevant content. If the page preview should include a page tear, a page tear is inserted into the page preview and query-relevant content is inserted into each portion of the page preview. In turn, data that cause presentation of the page preview are provided.

The process 600 can be implemented, for example, by the preview apparatus 120 and/or the search system of FIG. 1. In some implementations, the preview apparatus 120 is a data processing apparatus that includes one or more processors that are configured to perform actions of the process 600. In other implementations, a computer readable medium can include instructions that when executed by a computer cause the computer to perform actions of the process 600.

Data that specify a set of search results responsive to a search query are received (602). In some implementations, the search query includes one or more query terms and the search results each represent a resource that has been determined to have at least a minimum threshold relevance to at least one of the query terms. The data can include tidbits and snippets that have been selected for presentation in the search result, and other tidbits and snippets that have not been selected for presentation in the search result. The data that specify a set of search results can be received, for example, from the search system 110 of FIG. 1.

Query-relevant content is selected from a resource that is referenced by a search result that is included in the set of search results (604). In some implementations, query-relevant content is selected for each search result in the set of search results. In other implementations, the query-relevant content is selected for a threshold quantity (e.g., 3) search results that have been determined to be the most relevant search results (among the set of search results) for the search query. For example, the threshold quantity of search results can be the three search results that are associated with a highest relevance score for the search query and/or that have been selected for presentation at display positions that are the three most prominent display positions (e.g., the three search results selected for presentation at the first three positions on a search results page).

Query-relevant content includes text that matches at least one query term and/or other content that is associated with text that matches at least one query term. For example, each of the terms "Belgian" and "waffle" each match a query term in the search query "Belgian waffle," and are therefore query-relevant content for that search query. Additionally, an image (or other content) that is within a specified distance of query-relevant text is considered query-relevant content. Similarly, an image (or other content) having a filename (or other metadata such as image labels) that match at least one query term are also considered to be query-relevant content.

In some implementations, query-relevant content can be required to exactly match at least one query term in a search query. For example, in these implementations, the term "Belgian" is considered to match the search query "Belgian waffle," but will not match the search query "waffle from Belgium." In other implementation, query-relevant content for a search query can include variations of a search term, such as stubs, plurals, present tenses, past tenses, future tenses, synonyms, and/or terms that have been determined to be similar to the search query using, for example, term clustering techniques, user feedback, and other measures of similarity (e.g., cosine similarity measures).

A context of the query-relevant content is analyzed (606). In some implementations, analysis of the context of the query-relevant content includes an analysis of the location of the query-relevant content and an analysis of content that is presented within a threshold distance (e.g., a pre-specified quantity of pixels) of the query-relevant content. Analysis of the location of the query-relevant content can provide information as to the relative importance of the query-relevant content within the resource. For example, text that is located in a footnote or a caption to an image may be considered less important content than text that is in a body of a resource. Thus, query-relevant content that is located in a footnote or a caption may be considered less relevant than query-relevant content that appears in an article or another main body of text, as described in more detail below.

In addition to the location of the query-relevant content, other characteristics of the query-relevant content can be analyzed with respect to the relative importance of the text. For example, text that is linked to another network location (e.g., anchor text for a hypertext link to another web page) may be considered less important and/or less relevant than text that is not linked to another network location. Thus, query-relevant content that links to another network location may be considered less relevant than query-relevant content that does not link to another network location, as described in more detail below.

Analysis of the content that is presented within a threshold distance of the query-relevant content can provide additional information about the relative importance and/or relevance of the query-relevant content. For example, the term "waffle" is a query-relevant term for the search query "Belgian Waffle," and may appear at several different locations of a web page. However, some instances of the term "waffle" may be near other terms that are more relevant to the search query than the terms that are near other instances of the term "waffle." For example, one instance of the term "waffle" may appear in the sentence "Waffles of the Belgian variety originated in Belgium, and are leavened with yeast," while another instance of "waffle" may appear in the sentence "Mother never liked waffles or pancakes." Analysis of these two sentences may result in a determination that the first instance of the term "waffles" is more relevant to the search query due to its proximity to the term "Belgian," which is also a query term for the search query, whereas the term "waffle" in the second sentence is not located near instances of other query terms.

In some implementations, analysis of the context can include computing a context score for the query-relevant content based on a quantity of query terms that are within a threshold number of pixels of the query-relevant content and a total quantity of query terms that are included in the resource. For example, the resource can be analyzed to determine a total quantity of query terms that are included in the resource, and locations of each of the query terms. The location of each query term and the location of the query-relevant content are then used to determine a quantity of query terms that are within the distance of the query-relevant content. In turn, the context score is computed for each instance of query-relevant content using the determined quantity of query terms and the total quantity of query terms. For example, a ratio of the determined quantity of query terms relative to the total quantity of query terms (or some function thereof) can be used as a context score for the query-relevant content.

The context score can also be adjusted based on a category to which the query-relevant content belongs. For example, based on the analysis of the location of query-relevant content, the content can be categorized as main content (i.e., content that appears in the body of a resource, article, and/or document) or supporting content (i.e., content that was not categorized as main content). The supporting content can include footnotes, titles, captions, content that includes links to other network resources, and other supporting content (e.g., tags that have been assigned to the page by users).

In some implementations, the context score for supporting content is reduced by a support reduction factor. For example, the support reduction factor can be a value less than 1.0, and the context score for supporting content is reduced by computing a product of the context score and the reduction factor. The support reduction factor can vary, for example, to represent relative levels of importance of different types of supporting content. For example, a caption can have a higher support factor than a footnote, which may have a higher support factor than content that includes a link to another network location.

A set of query-relevant content is selected to be included in a page preview (608). In some implementations, the query-relevant content that is selected is query-relevant content that satisfies a minimum relevance threshold for the search query. The minimum relevance threshold can be specified, for example, as a minimum context score for the query-relevant content. For example, the set of query-relevant content can be the set of query-relevant content having the highest N context scores, where the number N can depend on a size of the page preview slot in which the page preview will be presented, an initial zoom level for the page preview, and/or a maximum number of page tears for the page preview.

A determination is made whether to insert a page tear in the page preview (610). In some implementations, the determination is made based on whether the set of query-relevant content is visible in a page preview that does not include a page tear. The set of query-relevant content is visible in a page preview that does not include a page tear if a contiguous portion of the resource that includes the set of query-relevant content is fully presented in the page preview slot at the initial zoom level for the page preview. For example, if the entire portion of the web page that includes the query-relevant content is within the borders of the page preview slot when presented at the initial zoom level, a determination to not insert a page tear is made.

The set of query-relevant content is not visible in a page preview when the contiguous portion of the resource is not fully presented in the page preview slot at the initial zoom level. For example, if any of the contiguous portions of the resource is outside of the visible page preview when presented at the initial zoom level, a determination to insert a page tear may be made.

In response to determining to not insert a page tear into the page preview, the set of query-relevant content is inserted into a page preview (612). The page preview can be, for example, a content template in which content can be inserted. For example, the set of query-relevant content can be inserted into the page preview by inserting a representation (e.g., an image) of the contiguous portion of the resource in which the query-relevant content is presented. In some implementations, the page preview is defined to have dimensions that are proportional to dimensions of the page preview slot in which the page preview will be presented. Additionally, the page preview can specify an initial zoom level for the representation of the resource that is inserted into the page preview. Once the set of query-relevant content is inserted into the page preview, data that cause presentation of the page preview are provided (614), as described in more detail below.

In response to determining to insert a page tear in the page preview, a page tear is inserted in the page preview (616). In some implementations, the page tear is inserted into the page preview by specifying one or more locations at which a graphical element, such as a line, curve, pair of curves, or another visual indicator of discontinuity is to be presented. The location of the page tear is used to define at least two portions of the page preview in which query-relevant content can be presented.

Query-relevant content is inserted in each portion of the page preview (618). In some implementations, the query-relevant content that is inserted in each portion of the page preview is selected from a different portion of the resource than those portions of the resource that are represented in other portions of the page preview, as described above with reference to FIG. 3. The portion of the page preview in which particular query-relevant content is inserted can be selected, for example, based on the relative position (relative location) of the particular query-relevant content in the resource. For example, query-relevant content that appears higher in the resource than other query-relevant content can be presented at higher portions of the page preview than the other query-relevant content. Thus, the position of the query-relevant content in the page preview can represent the relative location of the query-relevant content in the resource.

Data that cause presentation of the page preview are provided (614). In some implementations, the data are provided to a search system that provides the data with data that cause presentation of the search results page. In other implementations, the data are provided to the client device that submitted the search query.

The data that cause presentation of the page preview can include data that cause presentation of a page preview that includes at least two portions. The data that cause presentation of the two portions can also include data that cause presentation of query-relevant content in a portion of the page preview that represents the relative presentation position of the query-relevant content in the resource.

In some implementations, the data that cause presentation of the page preview include data that cause presentation of the page preview in a page preview slot that is adjacent to the search result for which the page preview was generated, e.g., HTML instructions. The data can further cause the page preview to be presented with an aspect ratio that is substantially the same as the aspect ratio of the resource.

The data that cause presentation of the page preview can further include scripts or instructions that condition presentation of the page preview upon receipt of data indicative of a user action, as described with reference to FIG. 3. For example, the data can condition presentation of the page preview on receipt of data indicating that the user clicked on a page preview user interface element that is presented with the search results. The data can also condition presentation of the page preview on receiving data specifying that the user clicked any portion of the display in which the search result is presented. In some implementations, user selection of the link to the resource referenced by the search result will not cause presentation of the page preview.

Additional actions upon which presentation of the page preview can be conditioned include actions such as a user placing a pointing device indicator over the search result (i.e., hovering over the search result). In some implementations, the page preview is presented only after the search result is hovered over for more than a threshold period of time. Prior to the threshold period of time, the search result can be highlighted in response to receiving data indicative of the hovering, where the highlighting is a visual indication that selection of the search result will initiate presentation of the page preview.

The data that cause presentation of the page preview can also include data that cause query-relevant content to be presented at a higher zoom level than other content presented in a same portion of the page preview. For example, scripts or instructions can cause query-relevant text to be presented at a larger font than other text that is presented in a same portion of the page preview as the query-relevant text.

The data that cause presentation of the page preview can further include a link to the resource that is represented in the page preview. For example, an active link that upon user selection redirects the client computer to the resource referenced by the search result can be associated with the page preview.

In some implementations, more than one link can be included for a particular page preview. When a page preview includes multiple portions (e.g., separated by a page tear), each of the portions of the page preview can be independently associated with a respective portion of the page preview. For example, one link can be associated with a first portion of the page preview and redirect the client device to a portion of the resource at which the query-relevant content of the first portion is presented. Similarly, another link can be associated with a second portion of the page preview and redirect the client device to a portion of the resource at which the query-relevant content of the second page preview is presented.

Figure 7:
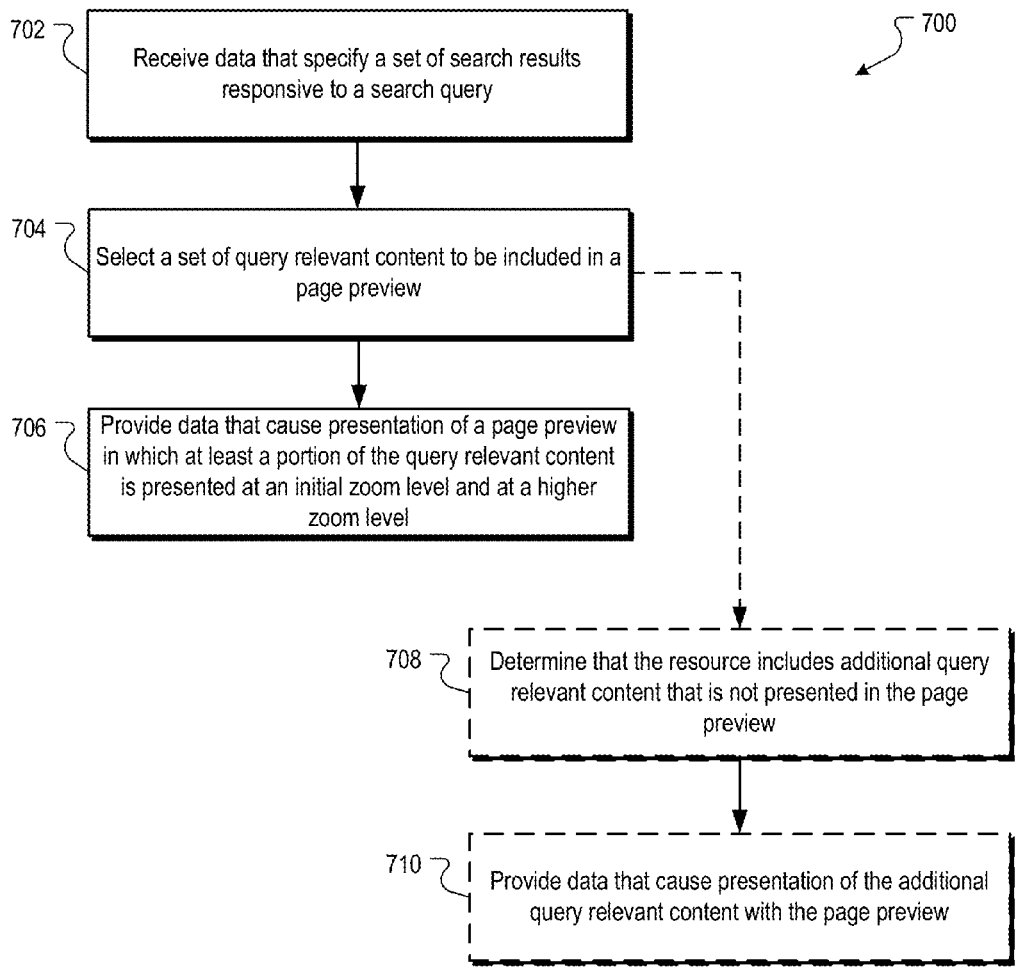
FIG. 7 is another example process for generating page previews.

FIG. 7 is another example process 700 for generating page previews. The process 700 is a process by which search result data (i.e., data that specify a set of search results responsive to a search query) are received. A set of query-relevant content is selected to be included in a page preview. In turn, data is provided that cause presentation of a page preview in which at least a portion of the query relevant content is presented at an initial zoom level and also presented at a higher zoom level (i.e., relative to the initial zoom level). In some implementations, a determination is made that the resource includes additional query relevant content that is not included in the page preview. In these implementations, data that cause presentation of the additional query relevant content with the page preview can be provided.

The process 700 can be implemented, for example, by the preview apparatus 120 and/or the search system of FIG. 1. In some implementations, the preview apparatus 120 is a data processing apparatus that includes one or more processors that are configured to perform actions of the process 700. In other implementations, a computer readable medium can include instructions that when executed by a computer cause the computer to perform actions of the process 700.

Data that specify a set of search results responsive to a search query are received (702). In some implementations, the search query includes one or more query terms and the search results each represent a resource that has been determined to have at least a minimum threshold relevance to at least one of the query terms. The data can include tidbits and snippets that have been selected for presentation in the search result, and other tidbits and snippets that have not been selected for presentation in the search result. The data that specify a set of search results can be received, for example, from the search system 110 of FIG. 1.

A set of query-relevant content is selected to be included in a page preview (704). The query-relevant content can be selected in a manner similar to that described above with reference to FIG. 6. For example, the query-relevant content can be query-relevant text and/or query relevant images (or other query relevant content) that have been determined to match the search query (i.e., content that matches one or more of the search terms).

Data that cause presentation of a page preview in which at least a portion of the query-relevant content is presented at both an initial zoom level and a higher zoom level are provided (706). In some implementations, the initial zoom level is a zoom level at which both the query-relevant content and other content are presented. For example, the initial zoom level can be a zoom level at which the content 510*a* is presented in FIG. 5. The higher zoom level is a zoom level is a zoom level that is higher than the initial zoom level, such that content presented at the higher zoom level appears larger than it appears at the initial zoom level. For example, the higher zoom level can be a zoom level at which the content 510*b* of FIG. 5 is presented. In this example, the data that cause presentation of the page preview includes data that cause presentation of an instance of query-relevant content (i.e., text and/or images) at the initial zoom level (e.g., as represented by content 510*a*) and also include data that cause presentation of an instance of the query-relevant content at a higher zoom level (e.g., as represented by content 510*b*).

A portion of the page preview that is presented at the higher zoom level can include both query-relevant content and adjacent content. For example, the content 510*b* includes the terms "Belgian Waffle" as well as additional text that is adjacent to the terms "Belgian Waffle." In some implementations, query-relevant content (i.e., matching terms, matching images, and other matching content) that is presented at the higher zoom level can be emphasized relative to other content that is also presented at the higher zoom level. For example, in FIG. 5, the query-relevant text "Belgian Waffle" has been bolded, while the other text included in the content 510*b* is not bolded. Other methods of visibly emphasizing content can also be used, such as highlighting the content, changing a font size of the content, and/or changing a font color of the content.

In some implementations, the data that cause presentation of the page preview can include data that cause a portion of the page preview that is presented at both the initial zoom level and the higher zoom level to be visibly emphasized in the page preview. For example, the content 510*a* that is presented at the initial zoom level can be highlighted or otherwise visibly emphasized relative to content that is not presented at the higher zoom level.

In some implementations, a determination is made that the resource includes additional query-relevant content that is not presented in the page preview (708). The determination can be made, for example, by determining that additional content that matches the search query is located at portions of the resource that have not been selected for presentation in the page preview. As described above, a portion of a search results page occupied by a page preview slot may be limited, such that all query-relevant content may not be presented in the page preview.

In response to determining that the resource includes the additional query-relevant content, data can be provided that cause presentation of the additional query-relevant content with the page preview (710). For example, data can be provided that cause presentation of the additional query-relevant content at a display position that is adjacent to the page preview. Alternatively, the data can cause presentation of an overlay in which the additional query-relevant content is presented at a portion of the display that overlaps with the page preview slot in which the page preview is presented. In some implementations, the data that cause presentation of the additional query-relevant content can also cause presentation of a user interface element indicating that the additional query-relevant content represents a portion of the resource that is not presented in the page preview. For example, the page preview and/or the overlay in which the additional query-relevant content is presented can include a directional arrow (or another indicator) indicating a direction of the non-visible portion of the resource from which the additional query-relevant content was selected.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
receiving data that specify a set of search results responsive to a search query, the search query including one or more query terms;
for one search result in the set of search results:
identifying, as portions of query-relevant content in a resource referenced by the search result, text that matches at least one query term of the search query;
for each of two or more portions of the identified query-relevant content:
computing a first score for the portion of query-relevant content, the first score being computed based on both a quantity of query terms that are within a threshold number of pixels of the portion of query-relevant content and a total quantity of query terms that are included in the resource;
determining a content category for the portion of query-relevant content; and
adjusting the first score based on the content category for the portion of query-relevant content;
selecting a set of query-relevant content based on the adjusted first scores of the two or more portions of query-relevant content;
inserting a page tear into a page preview in which the two or more portions of query-relevant content will be presented, the page tear defining a first portion and a second portion of the page preview, the first portion being different from the second portion;
inserting a first portion of query-relevant content from the resource into the first portion of the page preview;
inserting a second portion of query-relevant content from the resource into the second portion of the page preview, the second portion of query-relevant content being content selected from a portion of the resource that is not presented in the first portion of query-relevant content; and
providing data that cause presentation of the page preview.

2. The method of claim 1, further comprising:
analyzing a context of the portion of query-relevant content, the context including a location of the portion of query-relevant content and other content that appears within a threshold distance from the portion of query-relevant content; wherein
selecting the set of query-relevant content comprises selecting, based on the context, the two or more portions of query-relevant content that satisfy a minimum relevance threshold.

3. The method of claim 1, wherein adjusting the first score comprises reducing the first score in response to determining that the content category is one of a footnote or anchor text that links to another resource.

4. The method of claim 1, wherein providing data that cause presentation of the page preview comprises providing data that cause presentation of the first portion of the page preview and the second portion of the page preview at presentation positions that represent relative locations of the first portion of query-relevant content and the second portion of query-relevant content in the resource.

5. The method of claim 1, wherein providing data that cause presentation of the page preview comprises providing data that causes presentation of the page preview at a page preview slot that is adjacent to the search query.

6. The method of claim 1, wherein providing data that cause presentation of the page preview comprises providing data that cause presentation of the page preview in response to user selection of a page preview user interface element that is presented with the search results.

7. The method of claim 1, wherein providing data that cause presentation of the page preview comprises providing data that includes a link to the resource referenced by the search result.

8. The method of claim 7, wherein providing data that includes a link to the resource comprises providing data that includes a first link to a location of the resource at which the first portion of query-relevant content is located and further includes a second link to a location of the resource at which the second portion of query-relevant content is located.

9. The method of claim 8, wherein the first link is associated with the first portion of the page preview and the second link is associated with the second portion of the page preview.

10. The method of claim 1, wherein providing data that cause presentation of the page preview comprises providing data that cause presentation of the page preview in response to user selection of any portion of the search result other than a link to the resource referenced by the search result.

11. The method of claim 10, wherein providing data that cause presentation of the page preview further comprises providing data that cause the search result to be highlighted in response to receiving data indicating that a pointing device indicator is located over the search result.

12. The method of claim 1, wherein providing data that cause presentation of the page preview comprises providing data that cause the first query-relevant content to be presented with a larger font than at least a portion of other content included in the first portion of the page preview.

13. A computer storage medium encoded with a computer program, the program comprising instructions that when executed by data processing apparatus cause the data processing apparatus to perform operations comprising:
receiving data that specify a set of search results responsive to a search query, the search query including one or more query terms; and
for one search result in the set of search results:
identifying, as portions of query-relevant content in a resource referenced by the search result, text that matches at least one query term of the search query;
for each of two or more portions of the identified query-relevant content:
computing a first score for the portion of query-relevant content, the first score being computed based on both a quantity of query terms that are within a threshold number of pixels of the portion of query-relevant content and a total quantity of query terms that are included in the resource;
determining a content category for the portion of query-relevant content; and
adjusting the first score based on the content category for the portion of query-relevant content;
selecting a set of query-relevant content based on the adjusted first scores of the two or more portions of query-relevant content;
inserting a page tear into a page preview in which the two or more portions of query-relevant content will be presented, the page tear defining a first portion and a second portion of the page preview, the first portion being different from the second portion;
inserting a first portion of query-relevant content from the resource into the first portion of the page preview;
inserting a second portion of query-relevant content from the resource into the second portion of the page preview, the second portion of query-relevant content being content selected from a portion of the resource that is not presented in the first portion of query-relevant content; and
providing data that cause presentation of the page preview.

14. A system comprising:
a client device; and
one or more computers operable to interact with the device and further operable to:
receive data that specify a set of search results responsive to a search query, the search query including one or more query terms; and
for one search result in the set of search results:
identify, as portions of query-relevant content in a resource referenced by the search result, text that matches at least one query term of the search query;
for each of two or more portions of the identified query-relevant content:
compute a first score for the portion of query-relevant content, the first score being computed based on both a quantity of query terms that are within a threshold number of pixels of the portion of query-relevant content and a total quantity of query terms that are included in the resource;
determine a content category for the portion of query-relevant content; and
adjust the first score based on the content category for the portion of query-relevant content;

select a set of query-relevant content based on the adjusted first scores of the two or more portions of query-relevant content;

insert a page tear into a page preview in which the two or more portions of query-relevant content will be presented, the page tear defining a first portion and a second portion of the page preview, the first portion being different from the second portion;

insert a first portion of query-relevant content from the resource into the first portion of the page preview;

insert a second portion of query-relevant content from the resource into the second portion of the page preview, the second portion of query-relevant content being content selected from a portion of the resource that is not presented in the first portion of query-relevant content; and provide data that cause presentation of the page preview.

15. The system of claim 14, wherein the one or more computers comprise a server operable to interact with the device through a data communication network, and the device is operable to interact with the server as a client.

16. The system of claim 14, wherein the one or more computers are further operable to:

analyze a context of the portion of query-relevant content, the context including a location of the portion of query-relevant content and text that appears within a threshold distance from the portion of query-relevant content; and select, based on the context, the portions of query-relevant content that satisfy a minimum relevance threshold for inclusion in the set of query-relevant content.

17. The system of claim 14, wherein the one or more computers are further operable to provide data that cause presentation of the page preview, the data further comprising a first hypertext link to a location of the resource at which the first portion of query-relevant content is located and further includes a second hypertext link to a location of the resource at which the second portion of query-relevant content is located.

18. A method performed by data processing apparatus, the method comprising:

receiving data that specify a set of search results responsive to a search query, the search query including one or more query terms; and for one search result in the set of search results:

identifying, as portions of query-relevant content in a resource referenced by the search result, text that matches at least one query term of the search query;

for each of two or more portions of the identified query-relevant content:

computing a first score for the portion of query-relevant content, the first score being computed based on both a quantity of query terms that are within a threshold number of pixels of the portion of query-relevant content and a total quantity of query terms that are included in the resource;

determining a content category for the portion of query-relevant content; and adjusting the first score based on the content category for the portion of query-relevant content;

selecting a set of query-relevant content based on the adjusted first scores of the two or more portions of query-relevant content;

inserting a page tear into a page preview in which the two or more portions of query-relevant content will be presented, the page tear defining a first portion and a second portion of the page preview, the first portion being different from the second portion;

inserting a first portion of query-relevant content from the resource into the first portion of the page preview;

inserting a second portion of query-relevant content from the resource into the second portion of the page preview, the second portion of query-relevant content being content selected from a portion of the resource that is not presented in the first portion of query-relevant content; and providing data that cause presentation of the page preview, the data comprising data that cause presentation of the query-relevant content at an initial zoom level and at a higher zoom level, the initial zoom level being a zoom level at which both the query-relevant content and other content from the resource are presented in the page preview, the higher zoom level being a zoom level that is higher than the initial zoom level.

19. The method of claim 18, wherein:

providing data that cause presentation of the page preview comprises:

providing data that cause presentation of an instance of the query-relevant content at the initial zoom level; and providing data that cause presentation of another instance of the query-relevant content at the higher zoom level.

20. The method of claim 19, wherein the query-relevant content is presented at the higher zoom level and visibly emphasized relative to other content presented in the page preview.

21. The method of claim 18, wherein selecting a set of query-relevant content comprises selecting at least one query-relevant image; and providing data that cause presentation of the page preview comprises:

providing data that cause presentation of an instance of the query-relevant image at the initial zoom level; and providing data that cause presentation of another instance of the query-relevant image at the higher zoom level.

22. The method of claim 18, wherein providing data that cause presentation of the page preview further comprises providing data that cause a portion of the page preview that is presented at both the initial zoom level and the higher zoom level to be visibly emphasized at the initial zoom level.

23. The method of claim 18, further comprising:

determining that the resource includes additional query-relevant content that is not presented in the page preview; and providing data that cause presentation of the additional query-relevant content with the page preview, the presentation of the additional query-relevant content including a user interface element indicating that the additional query-relevant content is located at a portion of the resource that is not presented in the initial page preview.

24. A system comprising:

a client device; and one or more computers operable to interact with the device and further operable to:

receive data that specify a set of search results responsive to a search query, the search query including one or more query terms; and for one search result in the set of search results:

identify, as portions of query-relevant content in a resource referenced by the search result, text that matches at least one query term of the search query;

for each of two or more portions of the identified query-relevant content:
    compute a first score for the portion of query-relevant content, the first score being computed based on both a quantity of query terms that are within a threshold number of pixels of the portion of query-relevant content and a total quantity of query terms that are included in the resource;
    determine a content category for the portion of query-relevant content; and
    adjust the first score based on the content category for the portion of query-relevant content;
select a set of query-relevant content based on the adjusted first scores of the two or more portions of query-relevant content;
insert a page tear into a page preview in which the two or more portions of query-relevant content will be presented, the page tear defining a first portion and a second portion of the page preview, the first portion being different from the second portion;
insert a first portion of query-relevant content from the resource into the first portion of the page preview;
insert a second portion of query-relevant content from the resource into the second portion of the page preview, the second portion of query-relevant content being content selected from a portion of the resource that is not presented in the first portion of query-relevant content; and
provide data that cause presentation of the page preview, the data comprising data that cause presentation of the query-relevant content at an initial zoom level and at a higher zoom level, the initial zoom level being a zoom level at which both the query-relevant content and other content from the resource are presented in the page preview, the higher zoom level being a zoom level that is higher than the initial zoom level.

25. A computer storage medium encoded with a computer program, the program comprising instructions that when executed by data processing apparatus cause the data processing apparatus to perform operations comprising:

receiving data that specify a set of search results responsive to a search query, the search query including one or more query terms; and
for one search result in the set of search results:
    identifying, as portions of query-relevant content in a resource referenced by the search result, text that matches at least one query term of the search query;
    for each of two or more portions of the identified query-relevant content:
        computing a first score for the portion of query-relevant content, the first score being computed based on both a quantity of query terms that are within a threshold number of pixels of the portion of query-relevant content and a total quantity of query terms that are included in the resource;
        determining a content category for the portion of query-relevant content; and
        adjusting the first score based on the content category for the portion of query-relevant content;
    selecting a set of query-relevant content based on the adjusted first scores of the two or more portions of query-relevant content;
    inserting a page tear into a page preview in which the two or more portions of query-relevant content will be presented, the page tear defining a first portion and a second portion of the page preview, the first portion being different from the second portion;
    inserting a first portion of query-relevant content from the resource into the first portion of the page preview;
    inserting a second portion of query-relevant content from the resource into the second portion of the page preview, the second portion of query-relevant content being content selected from a portion of the resource that is not presented in the first portion of query-relevant content; and
    providing data that cause presentation of the page preview, the data comprising data that cause presentation of the query-relevant content at an initial zoom level and at a higher zoom level, the initial zoom level being a zoom level at which both the query-relevant content and other content from the resource are presented in the page preview, the higher zoom level being a zoom level that is higher than the initial zoom level.

* * * * *